Aug. 27, 1940.  J. D. LANGDON  2,212,607
DIAPHRAGM AND PRESSURE OPERATED VALVE
Filed Oct. 18, 1937
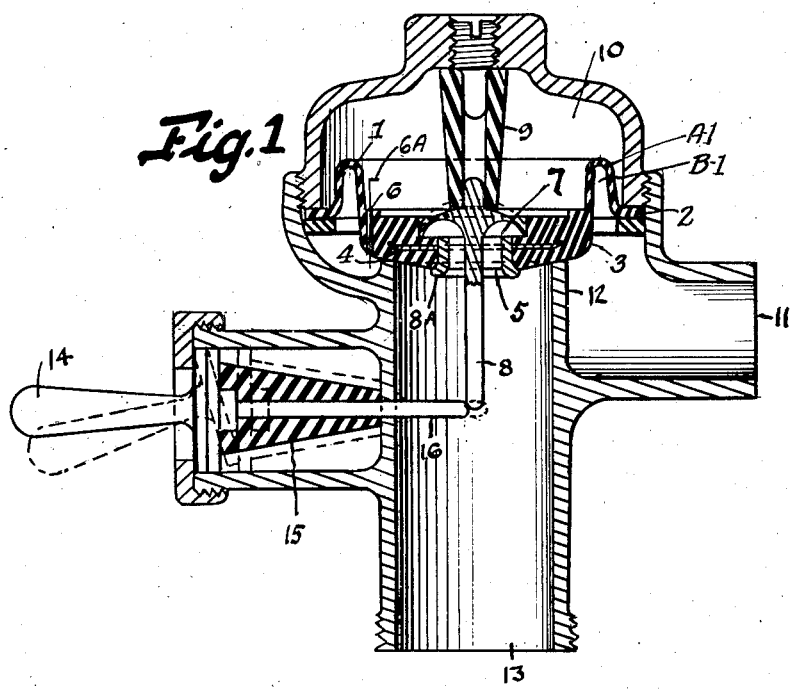
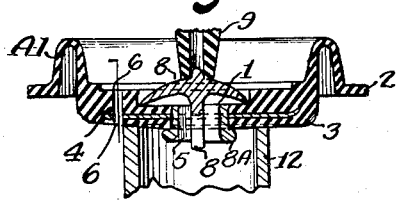 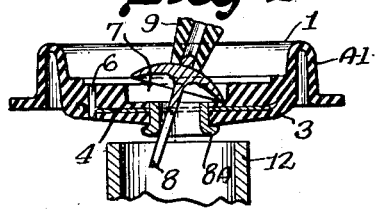
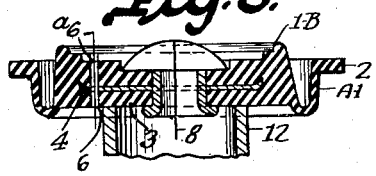 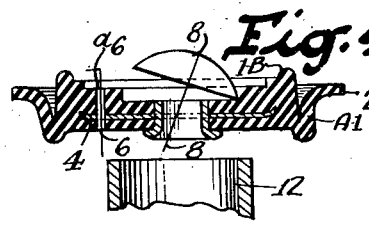
INVENTOR
J. D. Langdon Patented Aug. 27, 1940

2,212,607

UNITED STATES PATENT OFFICE 2,212,607

DIAPHRAGM AND PRESSURE OPERATED VALVE

Jesse D. Langdon, Los Angeles, Calif.

Application October 18, 1937, Serial No. 169,527

2 Claims. (Cl. 137—93)

My invention relates to diaphragms for use with fluid pressure operated valves, with the object in view of providing a diaphragm self-stabilized by fluid pressure in order to eliminate the necessity for the various stabilizing and guide elements ordinarily used to accomplish the purpose.

Other and further objects in my invention will appear as the descriptive matter proceeds. Two forms of reduction to practice are illustrated by the drawing which, it is specifically understood, is for the purpose of illustration only, and may be changed within the scope of what is claimed.

Of the drawing:

Fig. 1 is a section of a pressure operated valve, including a diaphragm 1 having a flange 2, an arched groove A1, a valve seating portion 3, metal insert 4, relief port 5, by-pass 6, by-pass pin 6A, relief valve seat 7, relief valve 8, resilient compression sleeve 9, pressure chamber 10, inlet 11, outlet seat 12, outlet 13, handle 14, resilient cushion sleeve 15, plunger 16.

Fig. 1a is a detail view of a portion of the structure shown in Fig. 1.

Fig. 2 is the same as Fig. 1a with the valve in open position.

Fig. 3 is a sectional view of an alternative form of diaphragm 1B, and fragmentary portion of valve seat 12.

Fig. 4 shows valve as of Fig. 3 in open position.

The construction and operation of my invention are as follows:

When the diaphragm 1 is in closed position in the valve, as of Fig. 1, the pressure chamber 10 is filled with fluid. When the handle 14 is moved in any direction lateral to the plane of the plunger 16, the resilient cushion sleeve 15 is compressed around the plunger 16 at a point where said plunger enters the outlet portion 13 of the valve body thus sealing the opening around the plunger against leaking, at the same time acting in lieu of a spring to return the plunger 16 and handle 14 to normal position. Manual operation of the handle 14 acts to impinge the plunger 16 against the relief valve stem 8 releasing the fluid under pressure from chamber 10. The end of the relief valve stem 8 normally hangs to a point approximating the center of the plunger 16 when the valve is in closed position, the stem of said relief valve 8 being rounded at the end so as to readily clear the plunger 16 and drop back to an upright position when the diaphragm has been raised by fluid pressure entering through inlet 11. The valve is now in open position, and fluid under pressure passes from the inlet port 11 over valve seat 12 and through outlet port 13. Fluid now gradually enters the compression chamber 10 through the by-pass passage 6, which is restricted by the by-pass pin 7 according to the size used, and the valve seat 3 of diaphragm 1 is gradually seated against the outlet seat 12 to close the valve. The compression sleeve 9 coacts with the pressure in the chamber 10 to force the relief valve 8 to move simultaneously with the diaphragm 1 to close the valve.

Very essential to the proper functioning of the relief valve 8 is its rounded stem and the distance to which said stem extends across the end of the plunger 16. The stem of the relief valve 8 must be the proper length in relation to the plunger 16 so as to rise above the plunger 16 when the relief valve stem is impinged to tip and open the valve. If the stem of the relief valve 8 is too long, both the relief valve and diaphragm will remain in a tipped position when plunger 16 is held in instead of assuming a level position, as it is necessary to the most efficient operation of the valve.

The two forms of diaphragm shown all include the circumferential groove capable of radial-lateral movement as to the wall of the relatively rigid rubber-like valve disk of substantial thickness forming the reinforced valve seating portion 4 of diaphragm 1, both forms shown having a relatively thin wall standing substantially parallel to both the wall of the valve seat 3 and the inner wall of the valve body whereby pressure exerted in a radial-lateral direction tends to stabilize and centralize the movement of the diaphragm valve seat 3 to and from the valve seat 12.

The form as of Fig. 1 shows a complete valve assembly including the diaphragm 1 molded with a circumferential groove B1 comprising a thin wall portion standing substantially at an angle or on a lateral plane in relation to the general diametrical plane of the diaphragm, the wall of this adaptation of my invention being subject to flexure upwardly and in a radial-lateral direction, both inwardly above the disk 4 having substantial thickness and forming the valve face 3 registering with valve seat 12 and outwardly against the internal wall of the valve when the relief valve 8 is open. It will be seen that the sides of the groove wall A1 offer a support of flexible material disposed edgewise in relation to the diameter of the diaphragm, and radial-lateral fluid pressure will force the outer wall A1 against the inner wall of the valve body.

When the wall A1 as of Fig. 4 is collapsed against the wall of the disk 4, or as in Fig. 1 where the wall A1 is forced radially outward against the inner wall of the valve body, the tension produced by pressure against the disk 4 and a thin folded wall A1 extended therefrom forming a deep groove is gradually relieved as fluid passes through the by-pass 6 into the pressure chamber 10.

In the form of diaphragm as of Fig. 3, with a circumferential groove formed by wall A1 disposed oppositely to the groove B1 of Fig. 1, radial-lateral fluid pressure acts to compress the wall radially inward toward the disk 4 of the diaphragm 1, achieving the purpose of stabilizing and centralizing the valve face 3 by substantially the same means, namely, the groove B1 as the full equivalent of the groove A1 insofar as the ultimate effect is concerned. When the radial-lateral pressure is exerted inwardly, the diaphragm becomes somewhat more rigid and is therefore adapted to use with higher pressures than the form shown in Fig. 1.

Referring again to Fig. 1, this figure illustrates the relative position of the various parts comprising the invention which is defined as including in the combination shown a valve casing having an inlet 11 and outlet 13 and a pressure chamber 10 between said inlet and outlet. A pressure actuated valve 1 comprising a resilient diaphragm having a relatively rigid disk 4 of substantial thickness adapted to close said outlet 13 and having a wall extending therefrom being folded to form an elongated groove standing coaxially with the thickened disk portion 4 one wall of said groove being formed by the longitudinal continuation of said thickened disk portion 4 the other wall of said pocket lying substantially parallel to the longitudinal confines of the thickened disk portion 4. A compression member 9 made of material elastic enough to resume normal shape after being deformed and presenting a body having a substantially solid wall subject to being elongated by the action of pressure exerted radially inward against the wall of said compression member 9, said member being disposed between the relief valve 8 and the opposite side of a pressure chamber. The relief valve 8 sealing a port through the center of diaphragm 1, both being urged to their respective seats by the compression member 9. The annular groove B1 is forced radially inward by external fluid pressure entering through the inlet 11 at the moment of opening the relief valve, at which time the pressure chamber 10 is temporarily under atmospheric pressure only, therefore subject to distortion which takes place due to the greater pressure exerted by fluid pressure entering through inlet 11, which affects the groove walls A1 lying beyond the thickened portion of the diaphragm 1; thus an elastic tension is created radially inward above the thickened disk 4 the resistance of which stands against the elastic tension of the wall A1. This pressure exerted radially inward all around the top of the disk 4 tends to stabilize the movement thereof toward the valve seat 12. The fluid pressure in chamber 10 entering through by-pass 6 from inlet 11 is completely equalized by the time the relief valve 8 is closed. The entry of fluid through the by-pass 6 is retarded by friction so that the differential in the movement of liquid between the inlet and chamber 10 plus the effort exerted by water pressure entering through said inlet 11 seeking the line of least resistance acts to maintain an elastic tension against the wall of the groove B1 until the diaphragm valve 1 has reached its seat, at which time the elasticity of the material comprising the diaphragm will urge the diaphragm to normal position.

It is of added advantage to have the inner extremity of the valve seat 12 located on a plane entirely beyond the inlet opening as illustrated by Fig. 1, whereby the transverse impact against the side of valve seat 12 by the fluid entering through inlet 11 will be confined to the wall area of the valve seat 12 and the valve member 1 will not be affected by such lateral impact. This reduces the tendency of the resilient member 1 to chatter or make other noises at the time of seating.

In order to overcome the effects of turbulence inherent in some body forms, it has been found necessary to arrange the wall A1 as in Fig. 3. wherein part or all of the thickened disk portion 4 lies within the confines of the thin wall formed by the continuation of said thickened portion extending from the edge of the outlet face 3 of said thickened portion, more stability being attained by forcing of the wall A1 radially inward against the disk 4 when fluid pressure is exerted.

Having described my invention and its operation, the following is claimed:

1. In a flush valve device, a hollow valve body comprising a fluid pressure chamber in its upper portion, a horizontally disposed inlet conduit communicating with the lower portion of said body, and a vertically arranged outlet conduit terminating at one end within said body and in a horizontal plane above the inlet to form a valve seat, a relatively rigid rubber-like valve disk of substantial thickness and of a diameter substantially less than that of said chamber mounted in said chamber and arranged to rest on said valve seat, a relatively thin flexible resilient rubber-like diaphragm integrally secured at one edge to said disk and having its outer edge secured to the wall of said housing, said diaphragm being folded to provide an annular groove between said disk and the wall of said chamber concentric with said valve disk and of a depth substantially equal to the thickness of said disk, said disk having a centrally disposed port therethrough, a relief valve arranged to seat over said port and a resilient compression sleeve mounted between the relief valve and the upper wall of said chamber, the resiliency of said sleeve together with the pressure of fluid on said diaphragm and said sleeve acting to stabilize and centralize said disk and to resist lateral vibratory movement of the same to prevent chattering as the disk approaches its seat.

2. A flush valve member comprising a relatively rigid rubber-like disk of substantial thickness having a central relief valve port, one face of said disk being adapted to engage a valve seat, and a relatively thin flexible resilient diaphragm portion of rubber-like material integrally secured at one edge to the peripheral edge of said disk adjacent the seat engaging face thereof, said diaphragm portion being folded to form an annular groove around the periphery of said disk, and the outer wall of said groove overlapping the periphery of said disk.

JESSE D. LANGDON.